United States Patent
Miller et al.

(10) Patent No.: US 9,580,326 B1
(45) Date of Patent: Feb. 28, 2017

(54) METHOD FOR CARBON DIOXIDE SPLITTING

(76) Inventors: James E. Miller, Albuquerque, NM (US); Richard B. Diver, Jr., Albuquerque, NM (US); Nathan P. Siegel, Sandia Park, NM (US)

(*) Notice: Subject to any disclaimer, the term of this patent is extended or adjusted under 35 U.S.C. 154(b) by 775 days.

(21) Appl. No.: 12/472,445

(22) Filed: May 27, 2009

Related U.S. Application Data

(60) Provisional application No. 61/056,484, filed on May 28, 2008.

(51) Int. Cl.
| | |
|---|---|
| *C01B 31/20* | (2006.01) |
| *C01B 31/18* | (2006.01) |
| *C01G 49/02* | (2006.01) |
| *C01G 51/04* | (2006.01) |
| *C01F 17/00* | (2006.01) |
| *C01B 15/043* | (2006.01) |
| *B01J 23/75* | (2006.01) |
| *B01J 23/745* | (2006.01) |
| *C01G 25/02* | (2006.01) |

(52) U.S. Cl.
CPC .............. *C01B 31/20* (2013.01); *B01J 23/745* (2013.01); *B01J 23/75* (2013.01); *C01B 15/043* (2013.01); *C01G 25/02* (2013.01); *C01G 49/02* (2013.01); *C01G 51/04* (2013.01)

(58) Field of Classification Search
CPC ........ C01B 31/18; C01B 31/20; C01B 15/043; C01G 25/02; C01G 49/02; C01G 51/04; B01J 23/745; B01J 23/75
USPC ................... 423/418.2, 437.1, 594.1–594.3, 594.5, 423/633

IPC .................................................... C01B 31/241
See application file for complete search history.

(56) References Cited

U.S. PATENT DOCUMENTS

| | | | |
|---|---|---|---|
| 4,237,105 A | 12/1980 | Bamberger et al. | |
| 6,440,385 B1 | 8/2002 | Chaklader | |
| 6,582,676 B2 | 6/2003 | Chaklader | |
| 2004/0163311 A1* | 8/2004 | Ahmed et al. | 48/127.9 |
| 2009/0107044 A1* | 4/2009 | Haile et al. | 48/127.7 |

FOREIGN PATENT DOCUMENTS

DE 102006032764 * 1/2008 ............. B01J 19/24

OTHER PUBLICATIONS

Miller et al (J. Mater. Sci., 2008, 43:4714-4728).*
Machine Translation of Roeb et al (DE102006032764).*

(Continued)

*Primary Examiner* — Jun Li
(74) *Attorney, Agent, or Firm* — Daniel J. Jenkins

(57) ABSTRACT

A method for splitting carbon dioxide via a two-step metal oxide thermochemical cycle by heating a metal oxide compound selected from an iron oxide material of the general formula $A_xFe_{3-x}O_4$, where $0 \leq x \leq 1$ and A is a metal selected from Mg, Cu, Zn, Ni, Co, and Mn, or a ceria oxide compound of the general formula $M_aCe_bO_c$, where $0<a<1$, $0<b<1$, and $0<c<2$, where M is a metal selected from the group consisting of at least one of a rare earth metal and an alkaline earth metal, to a temperature greater than approximately 1400° C., thereby producing a first solid-gas mixture, adding carbon dioxide, and heating to a temperature less than approximately 1400 C, thereby producing carbon monoxide gas and the original metal oxide compound.

12 Claims, 4 Drawing Sheets

(56) References Cited

OTHER PUBLICATIONS

R.B. Diver, J.E. Miller, M.D. Allendorf, N.P. Siegel, R.E. Hogan "Solar Thermochemical Water-Splitting Ferrite-Cycle Heat Engines" Journal of Solar Energy Engineering 130 (2008) 041001-1.
M.D. Allendorf, R. B. Diver Jr., N.P. Siegel, and J.E. Miller "Two-Step Water Splitting Using Mixed-Metal Ferrites: Thermodynamic Analysis and Characterization of Synthesized Materials" Energy & Fuels 2008, 22, 4115-4124.
T. Kodama and N. Gokon "Thermochemical cycles for high-temperature solar hydrogen production" Chem. Rev. 2007, 107, 4048.
Y. Tamaura and M. Tahata "Complete reduction of carbon dioxide to carbon using cation-excess magnetite" Nature 346, 255 (1990).
T. Kodama, H. Kato, G.S. Chang, N. Hasegawa, M. Tsuji, Y. Tamaura "Decomposition of $CO_2$ to carbon by $H_2$-reduced Ni(ii)- and Co(ii)-bearing ferrites at 300 °C," J. Mater. Res. 9, 462 (1994).
Tsuji M., Yamamoto T., Tamaura Y., Kodama T., Kitayama Y. "Catalytic acceleration for $CO_2$ decomposition into carbon by Rh, Pt or Ce impregnation onto Ni(II)-bearing ferrite" Appl. Catal. A 142, 31 (1996).
M. Tsuji, K. Nishizawa, T. Yoshida and Y. Tamaura "Methanation reactivity of carbon deposited directly from $CO_2$ on to the oxygen-deficient magnetite" J. Mater. Sci. 29, 5481 (1994).
J.-S. Kim, J.-R. Ahn, C.W. Lee, Y. Murakami and D. Shindo "Morphological properties of ultra-fine (Ni,Zn)-ferrites and their ability to decompose $CO_2$" J. Mater. Chem. 11, 3373 (2001).
S. Sharma, S. Hilaire, J.M. Vohs, R.J. Gorte, H.-W. Jen "Evidence for oxidation of ceria by $CO_2$" J. Catal. 190, 1999 (2000).

\* cited by examiner though irrelevant text omitted>

METHOD FOR CARBON DIOXIDE SPLITTING

RELATED APPLICATIONS

This application claims the benefit of U.S. Provisional Application No. 61/056,484, filed on May 28, 2008.

This invention was made with Government support under Contract No. DE-AC04-94AL85000 awarded by the Department of Energy. The Government has certain rights in the invention.

BACKGROUND OF THE INVENTION

The present invention relates generally to a method of splitting of carbon dioxide using a thermochemical cycle and, more particularly, to a method of splitting carbon dioxide using ferrite and ceria compositions in the thermochemical cycle.

CO is one fundamental component, the other being $H_2$, of syngas, the key intermediate for synfuel production. Reactions of syngas to form hydrocarbons are thermodynamically downhill. Hydrogen can be produced renewably with commercially available technologies, for example via photovoltaic (PV)-driven electrolysis. A reasonable starting estimate for the solar-to-hydrogen efficiency is about 9% (0.12(PV)×0.75(electrolysis)=0.09). Hydrogen can then be reacted with $CO_2$ to directly produce methanol, or indirectly to produce CO and then methanol, for example. Many of the important reactions of $CO_2$ and $H_2$ are not thermodynamically favorable (defined here as having a negative Gibbs free energy of reaction). (For example, the reverse water gas shift reaction is favorable only at very high temperatures and the direct synthesis of methanol is favorable only at temperatures lower than those required to carry out the conversion.) Nonetheless, it has been calculated that current technology would allow hydrocarbons to be manufactured from $CO_2$ and electrolytic $H_2$ with an electrical to hydrocarbon efficiency of roughly 40-50%. Thus a 5% sunlight-to-fuel efficiency is plausible for a PV-driven fuel production process.

Thermochemical cycles for water splitting are under development and avoid the efficiency-sapping sunlight to electrical energy conversion require for electrolysis and may somewhat improve the overall efficiency of both hydrogen and subsequent hydrocarbon production. Additionally, at high temperatures, $CO_2$ is thermodynamically less stable than $H_2O$. Thus, thermochemically splitting $CO_2$ in a process analogous to water splitting is thermodynamically feasible and also provides a direct route to manufacture CO for syngas and hydrocarbon production.

Cycles for splitting $CO_2$ (or $H_2O$) are endothermic and generally require at least one high temperature step to drive the reaction. Concentrating solar power (CSP) and can efficiently supply heat in excess of 800° C. and is potentially suited to operation of thermochemical cycles. Thermochemical cycles are typically categorized by temperature range. High temperature (HT) cycles are those that operate within the limits of most engineering materials and typically involve temperatures between 600 and 1000° C. Ultra-high temperature (UHT) cycles require heat input at temperatures in excess of 1000 and up to 3000° C. Only CSP can be applied to these cycles as materials constraints preclude NE above about 900° C.

Thermochemical cycles have conventionally been studied as potentially a more straightforward, efficient, and lower cost approach to hydrogen production than using electric power to electrolyze water. In the water splitting (WS) scenario, thermochemical cycles employ reactive materials or fluids in a series of chemical reactions that sum to the overall water splitting reaction $$H_2O \rightarrow H_2 + \tfrac{1}{2}O_2$$

One class of thermochemical cycles utilizes metal oxides as the internally recycled working material. $Fe_3O_4$ is the prototypical working material for these cycles. The overall idealized reaction scheme is:

$$Fe_3O_4 \rightarrow 3FeO + \tfrac{1}{2}O_2$$

$$3FeO + H_2O \rightarrow Fe_3O_4 + H_2$$

In practice, the temperature required to thermally reduce $Fe_3O_4$ to any significant extent is in excess of the melting point of both the oxide reactant and product, while the temperature of the hydrogen producing step is below the melting points. This inherent phase change renders the process unworkable as written. One strategy that has been developed to overcome this problem is to substitute other (A) metals into the $Fe_3O_4$ framework that have the effect of lowering the reduction temperature while maintaining the overall spinel structure.

Useful would be a method of splitting $CO_2$ using a similar thermochemical conversion cycle reaction and metal oxides that can be suitable used at operating conditions that favor $CO_2$ splitting.

DETAILED DESCRIPTION OF THE INVENTION

Figure 1:
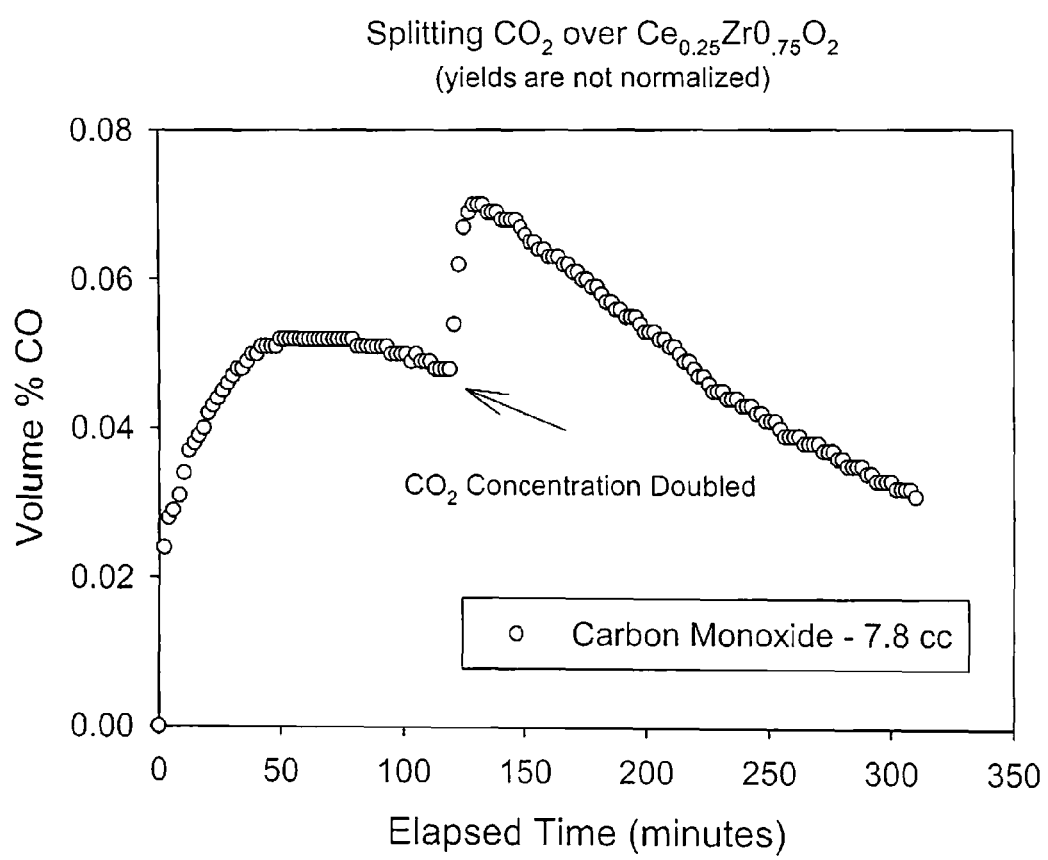
FIG. 1 shows a plot of CO concentration from $CO_2$ splitting using $Ce_{0.25}Zr_{0.75}O_2$.

The method of the present invention is $CO_2$ splitting via a two-step metal oxide thermochemical cycle:

$$AO_x \rightarrow AO_{(x-1)} + \tfrac{1}{2}O_2$$

$$\underline{AO_{(x-1)} + CO_2 \rightarrow AO_x + CO}$$

$$CO_2 \rightarrow CO + \tfrac{1}{2}O_2$$

In one embodiment, the system is ferrite based $$A_xFe_{3-x}O_4 \rightarrow xAO + (3-x)FeO + 0.5O_2$$

$$xAO + (3-x)FeO + H_2O \rightarrow A_xFe_{3-x}O_4 + H_2$$

where $0 \leq x \leq 1$ and A include metals such as, but not limited to, Mg, Cu, Zn, Ni, Co, and Mn.

These materials can be fabricated by many common techniques including precipitation from solution or calcination of the parent oxides. The materials can be supported on chemically inert monoliths, or directly fabricated into composite monolithic structures. In one embodiment, composites can consist of ferrite mixed with zirconia, yttria-stabilized zirconia (YSZ), hafnia, and yttria-doped hafnia. The mixtures (for example, ferrite/YSZ) can also be supported on an inert monolith. The ferrite can range from 0-100%, but is probably preferred (from a stability point of view) for ferrite to be <35% by weight.

The thermal reduction step (first reaction) is performed at temperatures greater than approximately 1000° C. The performance will be enhanced at temperatures greater than or equal to approximately 1400° C. The reduction can be performed under partial vacuum (to remove produced $O_2$) or flowing inert sweep gas (at the highest temperatures steam also can be used as a sweep).

The oxidation step (second reaction) is performed at a temperature no higher than the thermal reduction step, preferably at as low a temperature as possible. A typical temperature with useful reaction kinetics is approximately 1100° C. Performing the oxidation step at low temperatures (that is, much less than 1000° C.) can lead to coking or carbide formation. Co-feeding steam with the $CO_2$ can reduce or eliminate this problem.

In another embodiment, the ferrite-based material used is iron dissolved in zirconia or YSZ (that is, a system where there is only one crystalline phase). This can be manufactured by calcining mixtures of $Fe_2O_3$ and YSZ for 48 hours at 1350° C., for example, or by co-precipitating Fe, Y, and Zr from solution followed by calcination. Due to solubility limits, it appears that the composition will be less than about 5% $Fe_2O_3$ by weight. Excess $Fe_2O_3$ (present as a second phase) also contributes to the $CO_2$ splitting reaction, but is likely to volatilize, or melt during the course of multiple cycles. The reaction would be carried out under conditions similar to those outlined in the previous embodiment.

In another embodiment, a ceria-based material is used. The pure ceria system for $CO_2$ splitting is conceptually written as:

$$2CeO2 \rightarrow Ce2O3 + \tfrac{1}{2}O2$$

$$Ce2O3 + CO2 \rightarrow 2CeO2 + CO$$

Mixed metal cerium oxides (MMCO) can also be used, according to the general reaction scheme:

$$MMCO \rightarrow ODMMCO + \tfrac{1}{2}xO_2$$

$$ODMMCO + xCO2 \rightarrow MMCO + xCO$$

where MMCO is a mixed metal cerium oxide and ODMMCO is an oxygen deficient mixed metal cerium oxide. In particular, solid solutions of ceria and zirconia are of interest as are rare earth and alkaline earth doped cerium oxides (yttrium doping is of particular interest), and ternary compounds of ceria, zirconia and alkaline earth or rare earth elements (again Y doping is of particular interest), although many other dopant, e.g. calcium, gadolinium and lanthanum have been studied and produce similar effects. Ceria materials of the general formula MaCebOc, where 0<a<1, 0<b<1, and 0<c<2, can be used, where M is a metal selected from the group consisting of at least one of a rare earth metal and an alkaline earth metal, thereby producing a first solid-gas mixture comprising a second metal oxide and oxygen. As suggested for ferrites and pure ceria, it is likely not necessary to fully reduce the ceria to carry out the desired reactions. Further, it may not be desirable as phase changes are typically associated with volume changes that could induce cracking and failure in monolithic parts, or possibly unfavorable changes in reactivity and reversibility.

Thermal reduction would be carried out at temperatures greater than approximately 1000° C., with better reaction kinetics at higher temperatures, such as above approximately 1400° C. As noted previously, partial vaccum or inert flowing gas promotes the reduction. The oxidation step can be carried out at as low as possible but no higher than the thermal reduction temperature. In order to promote the oxidation reaction, a catalytic metal or metals, or metal oxide can also be present, for example, Ni or Cr metals or oxides, or noble metals. Supporting the material on a inert support or formation of a composite material with non reactive, or sparingly reactive solid can be done to enhance surface area and reactivity. Examples of such support materials include silica and titania. Alternately the material can be formed directly into a monolithic form.

In another embodiment, the material utilized in the $CO_2$ splitting cycle is a ceria/zirconia compound. Compositions for the nominal $(CeO_2)_x(ZrO_2)_{1-x}$ material range from $0<x\leq1$. The optimal composition is expected to have the range $0.2<x<0.8$. This material is again synthesized via standard techniques, where precipitation from solution is likely the most useful. The reduction step and oxidation steps are performed at the temperature and conditions as noted for the previous embodiments. Catalysts to promote the oxidation include Ni, NiO, chromia, and noble metals. Other elements such as Y, La and Ga can also be added in small amounts as promoters (less than 10 mol % of metal content). As with the other embodiments, the material can be put on a supporting material or formed directly into a monolithic form.

In another embodiment, yttrium-doped ceria material can be used with reaction conditions similar to the previously described ceria material. The preferred composition of the material would be from 0-10 mol % $Y_2O_3$.

In one embodiment, Ni-, Mn-, Ni/Mn-, and Co-doped ferrite powders were synthesized and reacted in the method of the present invention. For example, a cobalt ferrite formulation $Co_{0.67}Fe_{2.33}O_4$ blended with YSZ in 1:3 weight ratio was synthesized through co-precipitation of the metals from nitrate solutions with ammonium hydroxide. After aging, the solids were filtered, washed with deionized water, dried in a vacuum oven overnight at 80° C., and then typically calcined for 2 hrs at 1100° C. in air. Ceria zirconia compositions were similarly synthesized by coprecipitation from cerium nitrate and zirconyl nitrate or chloride. For manufacturing composites, YSZ was used as-received (3 or 8 mol % $Y_2O_3$, 0.63 μm average particle size).

Physical mixtures of the ferrite powder with the YSZ support were fabricated directly into monolithic structures for testing using at least three different methods. A moldless-fabrication, rapid prototyping technique was used to fabricate monoliths consisting of a series of rods arranged in a face-centered cubic-like geometry that offers no line-of-sight pathways, yet provides three-dimensional interconnectivity of the void spaces. Two sub-types of monoliths were cast with this technique, those designed to have dense, non-porous rods after firing at 1425° C., and those in which spherical polymethylmethacrylate (PMMA) pore former was added during the manufacture to produce a part that was nominally 75% void space. This addition required adjustment of feature sizes (rod diameters) to accommodate the larger particles. The second type of monolith was fabricated using the same slurry as the robocasting technique. In this case, however, the slurry with added pore former (75% targeted porosity) was simply poured into a cylindrical mold, allowed to dry at room temperature and then removed from the mold and fired at a temperature of at least 1400° C.

The flat faces of the resulting disk were then ground on a bench grinder to expose the porosity. A third type of monolith was formed by making an impression into a solidifying epoxy based composite.

The carbon dioxide splitting reaction was carried out in a typical laboratory-scale flow reactor consisting of a 2.53 cm O.D. by 66 cm long mullite tube situated in a high temperature furnace. The ferrite composite (or ceria/zirconia) disks were supported in the tube by plugs of refractory wool so that gas flow must pass through the thickness of the monolithic disks. $CO_2$ (0-100%) was fed during the carbon dioxide oxidation phase. The $CO_2$ stream can also be diverted through a saturator so that steam and $CO_2$ can be co-fed. The different sweep gasses facilitate chemical analysis of the reactor effluent by gas chromatography using a thermal conductivity detector. Gas samples were collected and analyzed at 2 min intervals during the thermal reduction and oxidation cycles. Background oxygen levels in the system were typically measured to be between 20-100 ppm.

Figure 2:
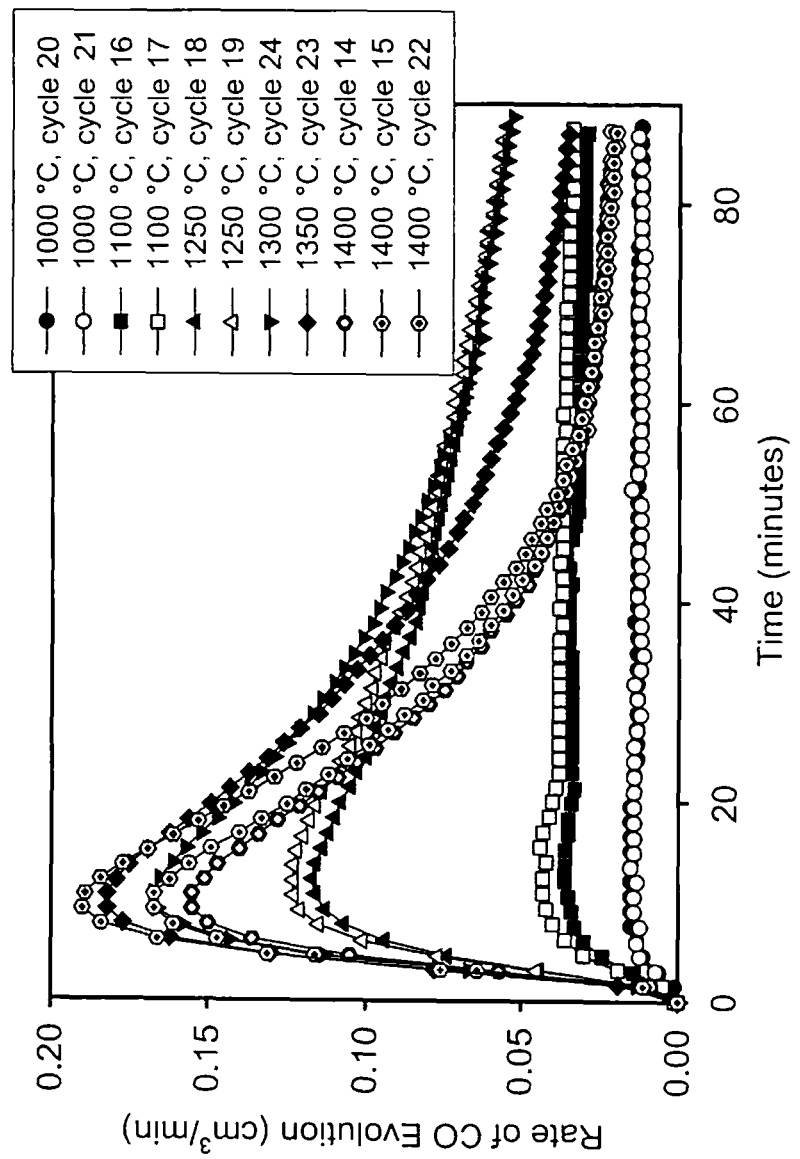
FIG. 2 shows CO production from $CO_2$ as a function of time for different reaction temperatures over a 1 gram monolith of 95% by weight ($Ce_{0.4}Zr_{0.6}O_2$) and 5% (NiO).

In one embodiment, a ceria based material, $Ce_{0.25}Zr_{0.75}O_2$, was tested and demonstrated $CO_2$ decomposition. FIG. 1 shows a plot of CO concentration taken with a gas chromatograph as the 2.2 g (50% porous disk) sample was exposed to a 50 Scm$^3$ gas flow containing 10% and 20% $CO_2$ in He within a tube furnace at a temperature of 1100° C. During the water splitting reaction the sample was exposed to a stream of argon saturated with water at a temperature between 80-90° C. for a concentration of 56-80% water in argon. FIG. 2 shows CO production from $CO_2$ as a function of time for different reaction temperatures over a 1 gram monolith of 95% by weight ($Ce_{0.4}Zr_{0.6}O_2$) and 5% (NiO). The monolith was thermally reduced at 1450° C. in flowing helium prior to each cycle shown in figure. More than 65 cycles of $H_2O$ and $CO_2$ splitting were demonstrated with this sample.

Cobalt ferrite on YSZ, $Co_{0.67}Fe_{2.33}O_4$:YSZ (1:2-4 wt %), showed repeatable $CO_2$ decomposition under conditions similar to those used for the ceria material. FIG. 2 shows results taken with a gas chromatograph from successive $CO_2$ splitting cycles using $Co_{0.67}Fe_{2.33}O_4$:YSZ, 1:3 wt %.

These tests were run in the lab setup (tube furnace) in batch mode using a 1.6 g sample of the reactive material with a lattice-type structure. The first step in the cycle was a thermal reduction under argon at 1400° C. for several hours. A mixture of 5% carbon dioxide and helium (55 sccm) was introduced following the thermal reduction and the reactor temperature was lowered to 1100 C at which point CO production was observed. Several cycles were run with the yield of product CO increasing for successive cycles. Increasing the concentration of the $CO_2$ should, according to equilibrium thermodynamics, increase the amount of CO produced.

Figure 3:
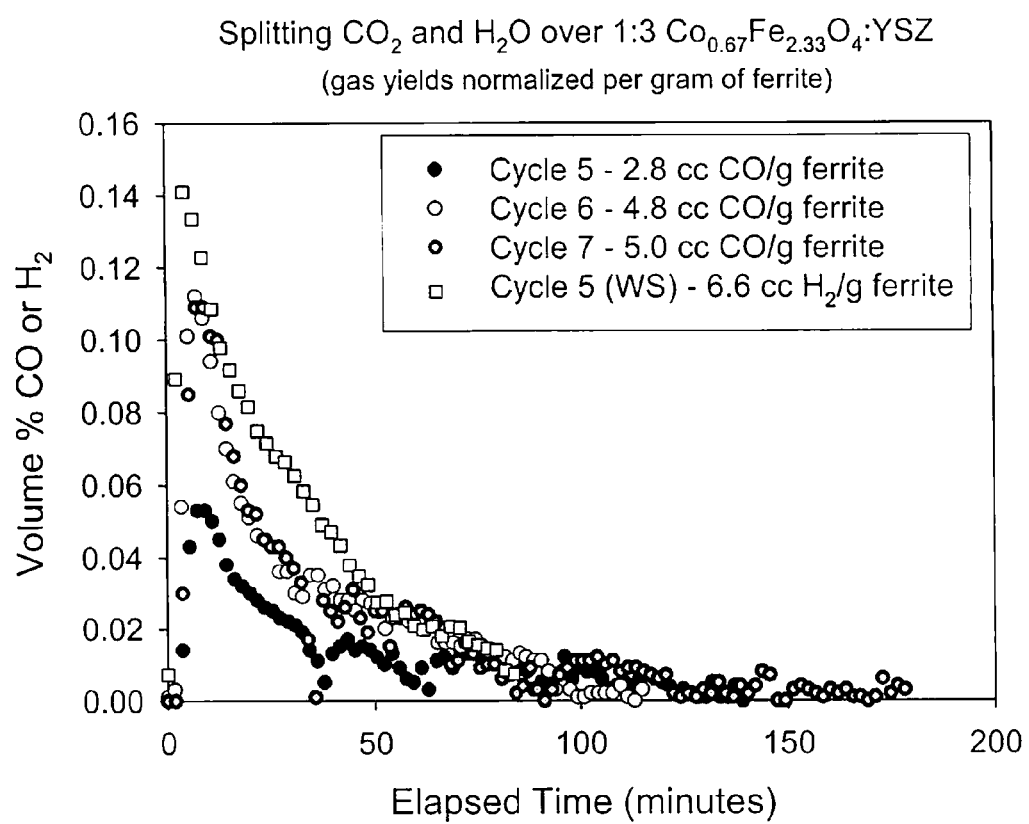
FIG. 3 shows results taken with a gas chromatograph from successive $CO_2$ splitting cycles using $Co_{0.67}Fe_{2.33}O_4$:YSZ, 1:3 wt %.
Figure 4:
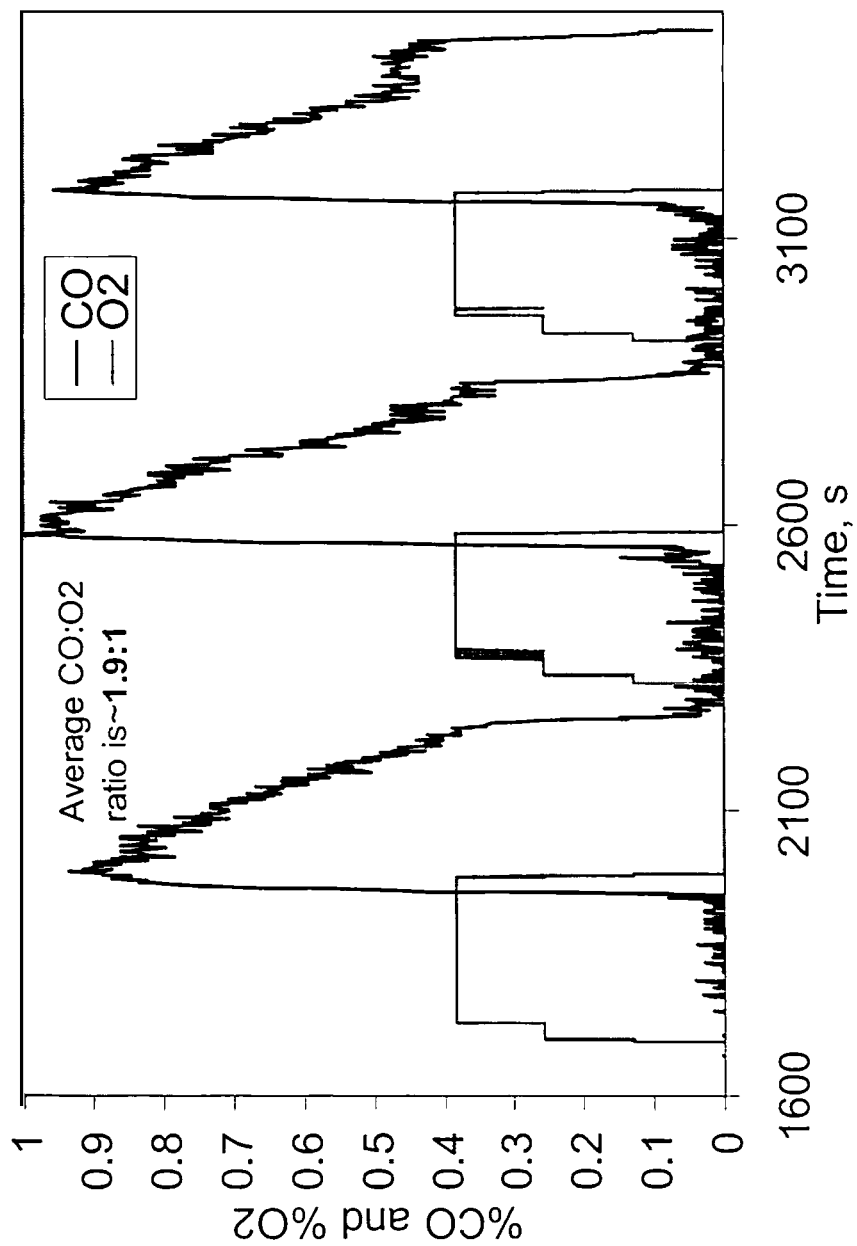
FIG. 4 shows $O_2$ and CO production over three successive cycles using a solar heat input to drive the reaction.

In one embodiment, the thermochemical cycle reaction was performed using solar energy to provide the high temperature reaction environment. Solar furnace based tests used a reactor configuration wherein reactive material samples were heated directly with concentrated solar energy. The configuration allows for rapid heating and cooling. Product gases were analyzed with a non-dispersive infrared (NDIR) analyzer that provides a sensing response time of about five seconds to reach full scale. The combination of rapid heating and cooling along with the response time of the NDIR analyzer made it possible to collect data relevant to determining reaction rates with this experimental system. Tests were run in batch mode in two reaction steps: an $O_2$ producing thermal reduction of the solid reactive material and an oxidation of the reduced solid reactive material using $CO_2$. The thermal reduction step was typically done between 1400 and 1600° C. under an inert atmosphere of either argon or helium. The duration of this reaction step ranged upward from one minute at a minimum. The oxidation step was run at a temperature between 800 and 1200° C. under an atmosphere containing $CO_2$ in a concentration between 10-100%. The reaction duration ranged upward from one minute. The gas flow rate of both the inert and the carbon dioxide ranged from 50-1000 Scm$^3$/min. FIG. 3 shows $O_2$ and CO production over three successive cycles using a solar heat input to drive the reaction. The ratio of CO to $O_2$ produced in the two reaction steps is nearly 2:1, which is indicative of $CO_2$ decomposition as opposed to CO production from a different source e.g. contamination.

In another embodiment, ceria materials were used in the $CO_2$ splitting thermocycle reaction. In particular, ceria/zirconia formulations, such as $Ce_{0.5}Zr_{0.5}O_2$, were tested in multiple cycles.

The invention being thus described, it will be apparent to those skilled in the art that the same may be varied. Such variations are not to be regarded as a departure from the spirit and scope of the invention, and all such modifications are intended to be included within the scope of the following claims.

We claim:

1. A method for splitting carbon dioxide, comprising:
heating a first metal oxide compound to 1400° C. at which the first metal compound reduces, thereby producing a solid-gas mixture comprising a second metal oxide and oxygen;
reacting said second metal oxide with carbon dioxide at 1100° C. at which the second metal oxide oxidizes, thereby producing carbon monoxide gas and the first metal oxide compound; and
separating said carbon monoxide gas;
wherein the first metal oxide compound comprises a metal oxide selected from a group consisting of $Co_{0.67}Fe_{2.33}O_4$/YSZ and $Ce_{0.25}Zr_{0.75}O_2$.

2. The method of claim 1 wherein the step of heating the first metal oxide compound is performed under a partial vacuum to remove produced oxygen.

3. The method of claim 1 wherein a flowing inert gas is used to remove produced oxygen during the step of heating the first metal oxide compound.

4. The method of claim 1 wherein said first metal oxide compound is supported on a monolith.

5. The method of claim 1 wherein said first metal oxide compound is fabricated into a composite monolithic structure.

6. The method of claim 5 wherein said composite monolithic structure comprises a compound selected from the group consisting of zirconia, yttria-stabilized zirconia, hafnia and yttria-doped hafnia.

7. The method of claim 1 wherein said first oxide material is dissolved in a material selected from zirconia or yttria-stabilized zirconia, thereby producing a single crystalline phase material.

8. The method of claim 7 wherein said single crystalline phase material is supported on a monolith.

9. The method of claim 1 wherein heating said first metal oxide compound occurs in the presence of a catalyst.

10. The method of claim 9 wherein said catalyst is selected from Ni, Cr, or a noble metal.

11. The method of claim 1 wherein heating said first metal oxide compound occurs in the presence of a promoter added at a mole fraction of less than 10 mol % of metal content, said promoter selected from Y, La and Ga.

12. The method of claim 1, wherein said heating is provided using solar energy.

\* \* \* \* \*